United States Patent [19]

Pippin et al.

[11] Patent Number: 5,186,336
[45] Date of Patent: Feb. 16, 1993

[54] PRODUCT SORTING APPARATUS

[75] Inventors: James M. Pippin, Keller; Kenneth C. Flagg, Jr., Arlington; Gary S. Robertson, Euless, all of Tex.

[73] Assignee: ElectroCom Automation L.P., Arlington, Tex.

[21] Appl. No.: 643,853

[22] Filed: Jan. 22, 1991

[51] Int. Cl.5 .......................... B07C 5/36; B07C 3/06; B65G 47/00
[52] U.S. Cl. .................................. 209/583; 198/460; 198/367.2; 209/657; 209/900; 271/270; 271/297; 271/305
[58] Field of Search ............... 209/564, 565, 566, 569, 209/583, 657, 934, 900; 271/305 X, 297 X, 270 X; 364/478; 198/460 X, 367.1, 367.2 X, 781

[56] References Cited

U.S. PATENT DOCUMENTS

| | | | |
|---|---|---|---|
| 2,891,667 | 6/1959 | Truver | 209/657 |
| 3,141,540 | 7/1964 | Burkhardt | 209/566 |
| 3,458,026 | 7/1969 | Lauzon | 198/460 |
| 4,248,389 | 2/1981 | Thompson et al. | 209/583 |
| 4,281,756 | 8/1981 | Bruno | 198/460 X |
| 4,432,458 | 2/1984 | Daboub | 209/564 |
| 4,503,976 | 3/1985 | Cloud et al. | 209/564 X |
| 4,697,689 | 10/1987 | Carrell | 414/757 X |
| 4,711,357 | 12/1987 | Langenbeck et al. | 209/565 |
| 4,746,003 | 5/1988 | Yu et al. | 198/367 |
| 4,926,215 | 5/1990 | Rank, Jr. | 271/270 X |
| 4,984,692 | 1/1991 | Obara | 209/583 |
| 5,048,694 | 9/1991 | Iwamoto | 271/270 |

FOREIGN PATENT DOCUMENTS 2182299  5/1987  United Kingdom ............... 198/460

Primary Examiner—Donald T. Hajec
Attorney, Agent, or Firm—Harold E. Meier

[57] ABSTRACT

A wide variety of product types, sizes and shapes are sorted into designated destination bins or other outputs utilizing a computer controlled transport path that includes an infeed section and a pinch roller diverting section. The infeed section receives a singulated stream of products to be sorted, optically scans each product for a destination code and transports the products downstream to the diverting section. The diverting section consist of a series of individually and selectively controlled roller pairs in combination with a number of diverting gates. Each roller pair includes an upper foam covered pinch roller and a lower friction drive roller oriented such that products moving downstream pass between each roller pair until diverted from the transport path. An array of photoelectric detectors provide product position information to identify and track product movement through the apparatus. The computer controls the transport path by energizing individual drive rollers to effectuate downstream product movement, and actuating diverting gates to divert the products from the transport path into designated output bins according to their scanned destination codes.

16 Claims, 10 Drawing Sheets

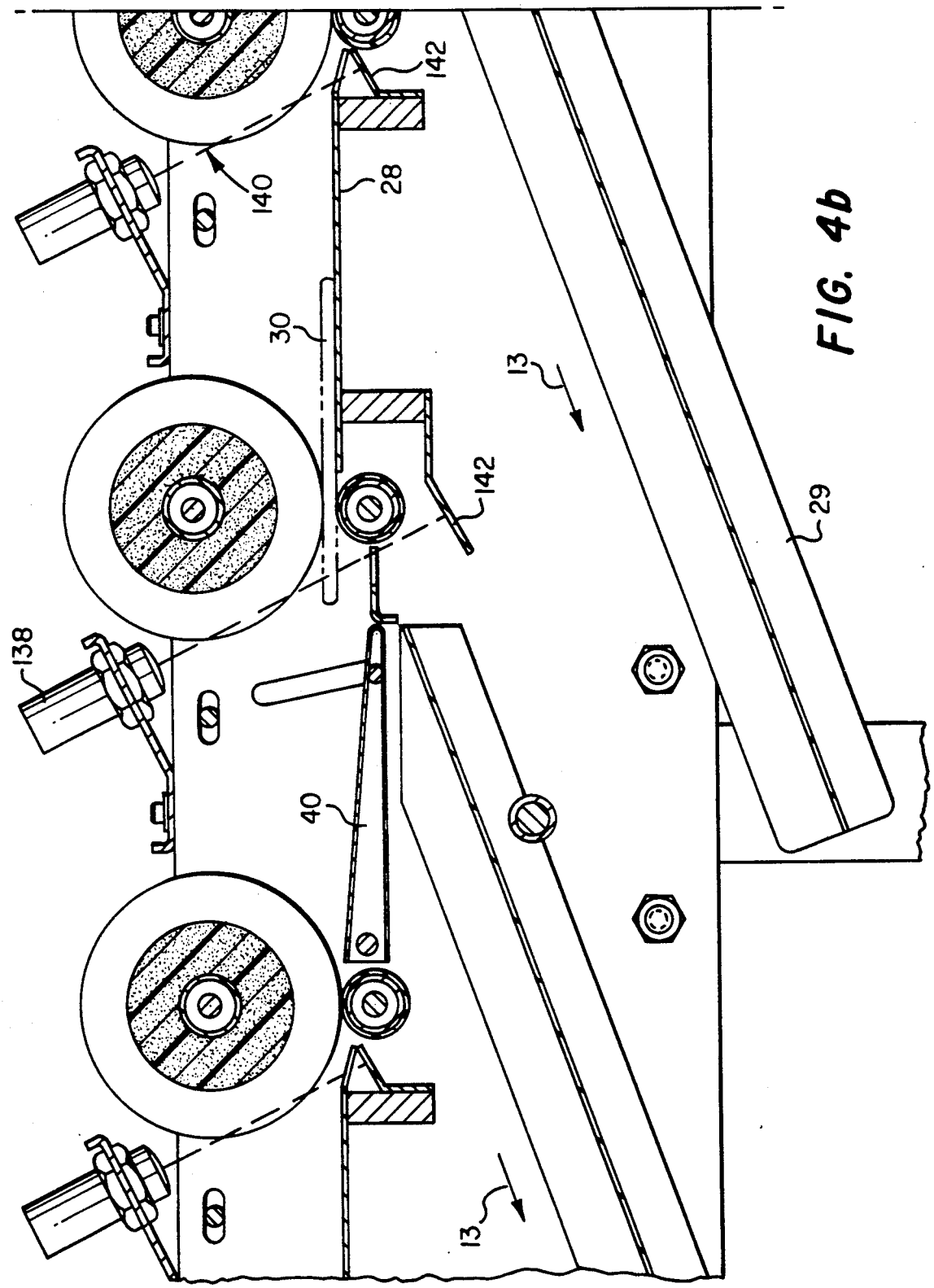

PRODUCT SORTING APPARATUS

TECHNICAL FIELD

This invention relates to separating and sorting packages, and more particularly to an apparatus utilizing a computer controlled transport path to sort a wide variety of products into designated output bins.

BACKGROUND OF THE INVENTION

Historically, bulk products have been hand separated and sorted by human operators who manually separated the products into individual bins or delivered the product to a sorting machine after inputting a product destination code. The sorting machine then delivered the product to its proper destination point according to the input destination code. Provision has also been made for the machine to scan the product for its destination code rather than have it manually input.

One drawback experienced with the manual method for separating and sorting is that total product processing time is a function of each human operator's familiarity with the product and its post-separation and sorting destination. An operator who is unfamiliar with a particular product's destination or who is confronted with an unrecognized product would be forced to check the product destination list to insure proper product sorting. Operator unfamiliarity destination with the proper product delays the sorting process, reduces net product throughput and cuts into the profits of the sorting operation. An additional drawback of the manual separation and sorting process is its susceptibility to error as a careless human operator may fail to correctly separate and sort the product into its intended destination bin.

Automated sorting machines have heretofore processed products through a transport path by sandwiching the product between two vertical conveyor belts or by pushing the product on edge through a transport channel. Products are then diverted from the transport path into designated bins by inserting a diverting gate between the conveyors, or by pushing the product out of the transport channel. For each type of sorting machine, the transitional throughput for the drive mechanisms causing downstream product movement are fixed. Thus, there was no ability to intermittently or individually control the downstream progress of each product. In addition, the distance between the two conveyor belts and the width of the processing channel are fixed for each machine. Thus, a further drawback of these prior art sorting machines is the limitation of only processing products of one or a limited number of sizes as determined by the spacing between the vertical conveyor belts or the channel width. Furthermore, the rigid shape of the belts and channel did not allow for irregularly shaped products to be processed. All non-conforming products were therefore inconveniently separated or sorted by hand or by another machine.

The drawbacks associated with hand or prior art machine sorting reflect poorly on the sorting operation both economically and in terms of customer goodwill. Accordingly, there is a need for an automated separation and sorting apparatus that will efficiently and accurately separate and sort into designated destination bins a wide variety of product types, sizes and shapes.

SUMMARY OF THE INVENTION

The present invention overcomes the foregoing problems associated with manual or machine sorting by providing an apparatus for sorting a wide variety of product types, sizes and shapes into designated receptacles. In accordance with the broader aspects of the invention, a computer controlled transport path characterized by an infeed conveyor belt and a pinch roller diverting sorter, receives a singulated stream of products at the upstream input end, scans each product in the product stream for a destination identification label, and diverts the identified product from the transport path into a designated destination bin or takeaway belt at the downstream output end according to the scanned destination identification label.

The infeed conveyor belt receives at its upstream end a singulated stream of products to be sorted and transports the products downstream to the diverting sorter. A bar code scanner located above the transport path reads an identifying bar code on each product and transmits the code identifier to a control computer. The computer compares the transmitted identification code to a list of reference codes stored in the computer's memory, determines the destination bin into which each product in the product stream should be diverted, and stores product sequence and destination bin data in a list table to be referenced by the computer during the sorting operation.

The diverting sorter includes cf a series of roller pairs to effectuate downstream product movement through the transport path and a number of diverting gates to divert products from the transport path into designated destination bins. Each roller pair comprises of an individually and selectively computer controlled variable speed drive roller and a vertically adjacent non-driven pinch roller. The roller pairs extend laterally across the width of the transport path and are positioned relative to the transport path such that the plane defining the transport path passes between the drive and pinch rollers. Thus, products traveling downstream through the diverting sorter transport path pass between the roller pairs until diverted into a destination output bin by one of the included diverting gates.

Orientation of the transport path and roller pairs in this manner enables the drive roller to more efficiently cause downstream product movement as the pinch roller acts to increase the friction force between the product and the drive roller. Because the pinch roller is covered in a soft foam material, the apparatus can handle and sort irregularly contoured products. Furthermore, use of a soft covered pinch rolled decreases the likelihood that the pinching action will cause damage to fragile or delicate products.

The diverting sorter further comprises a number of computer controlled diverting gates that are selectively placed between adjacent pinch roller pairs along the length of the transport path. A destination bin corresponding to each included diverting gate is positioned underneath the transport path to receive diverted products. Actuation of a diverting gate by the computer directs a product from the transport path into the underlying destination bin according to the scanned identification bar code.

The control computer utilizes an array of sensors positioned along the transport path to track product location within and movement through the apparatus. The tracked product information is continuously updated and cross-referenced to the product sequence and destination bin table to insure that the proper diverting gates are actuated to accurately sort the product stream.

The use of individually and selectively controlled variable speed drive rollers enables the computer, in response to detected product location information, to adjust the downstream velocity of products and control the relative position between products moving through the transport path. Computer roller control of individual products in this manner prevents tailgating of preceding products thereby reducing the likelihood of product jams, stacking or inaccurate sorting.

The automated product separation and sorting apparatus of this invention efficiently and accurately separates and sorts various sized and shaped packages having attached identifying bar codes into designated destination bins.

Possible applications include the sorting of magazines, postal mail and warehouse inventory. Other advantages and applications deriving from the use of the invention will readily suggest themselves to those skilled in the art from consideration of the following Detailed Description taken in conjunction with the accompanying Drawings.

BRIEF DESCRIPTION OF THE DRAWINGS

A more complete understanding of the invention may be had by reference to the following Detailed Description when taken in conjunction with the accompanying Drawings, wherein:

FIG. 4A and 4B are a longitudinal cross-sectional view of the product sorting apparatus as shown in FIG. 1;

DETAILED DESCRIPTION OF THE DRAWINGS

Figure 1:
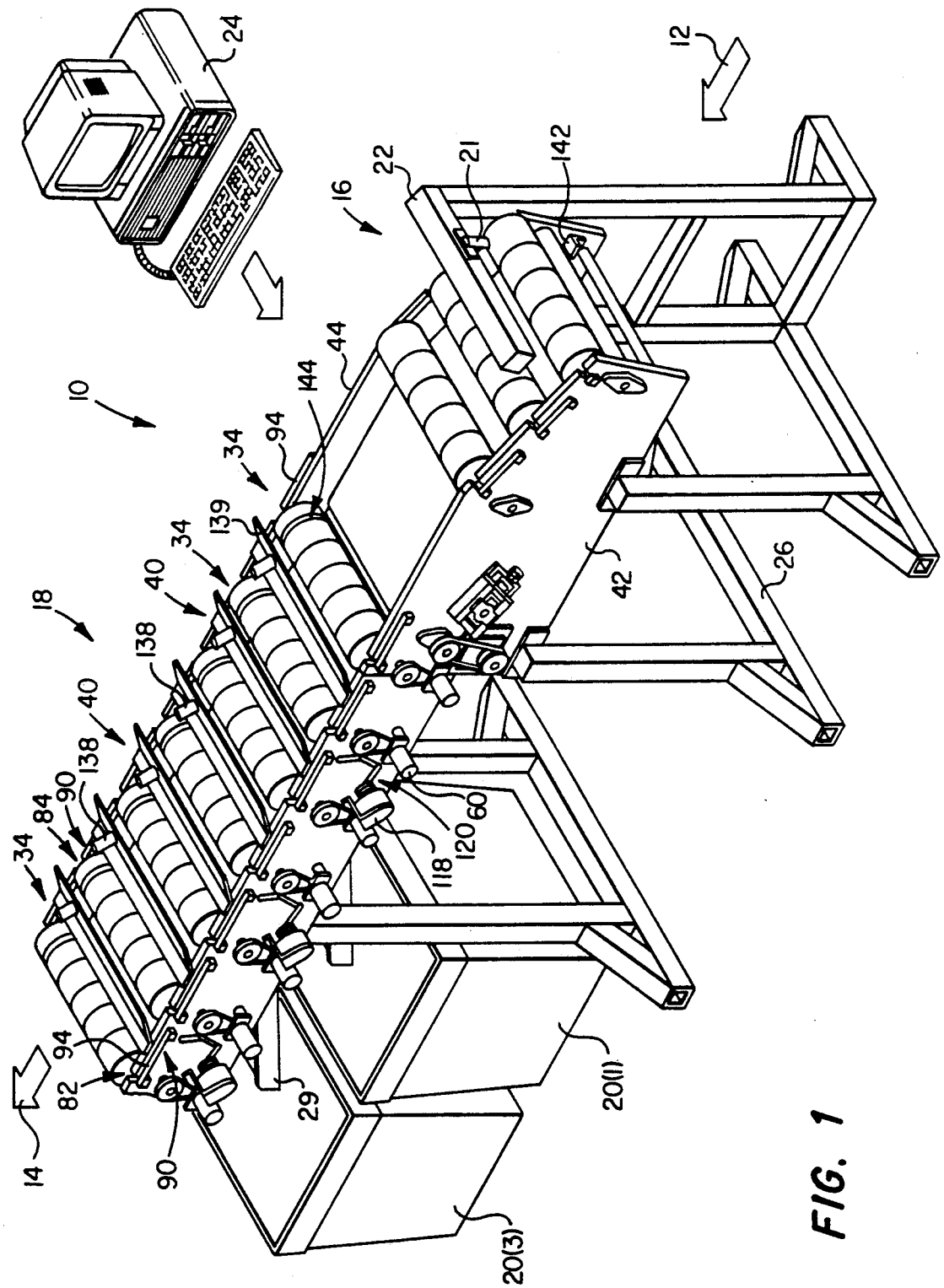
FIG. 1 shows a perspective view of the product sorting apparatus in which parts have been cut away to more clearly illustrate certain features of the invention.
Figure 2:
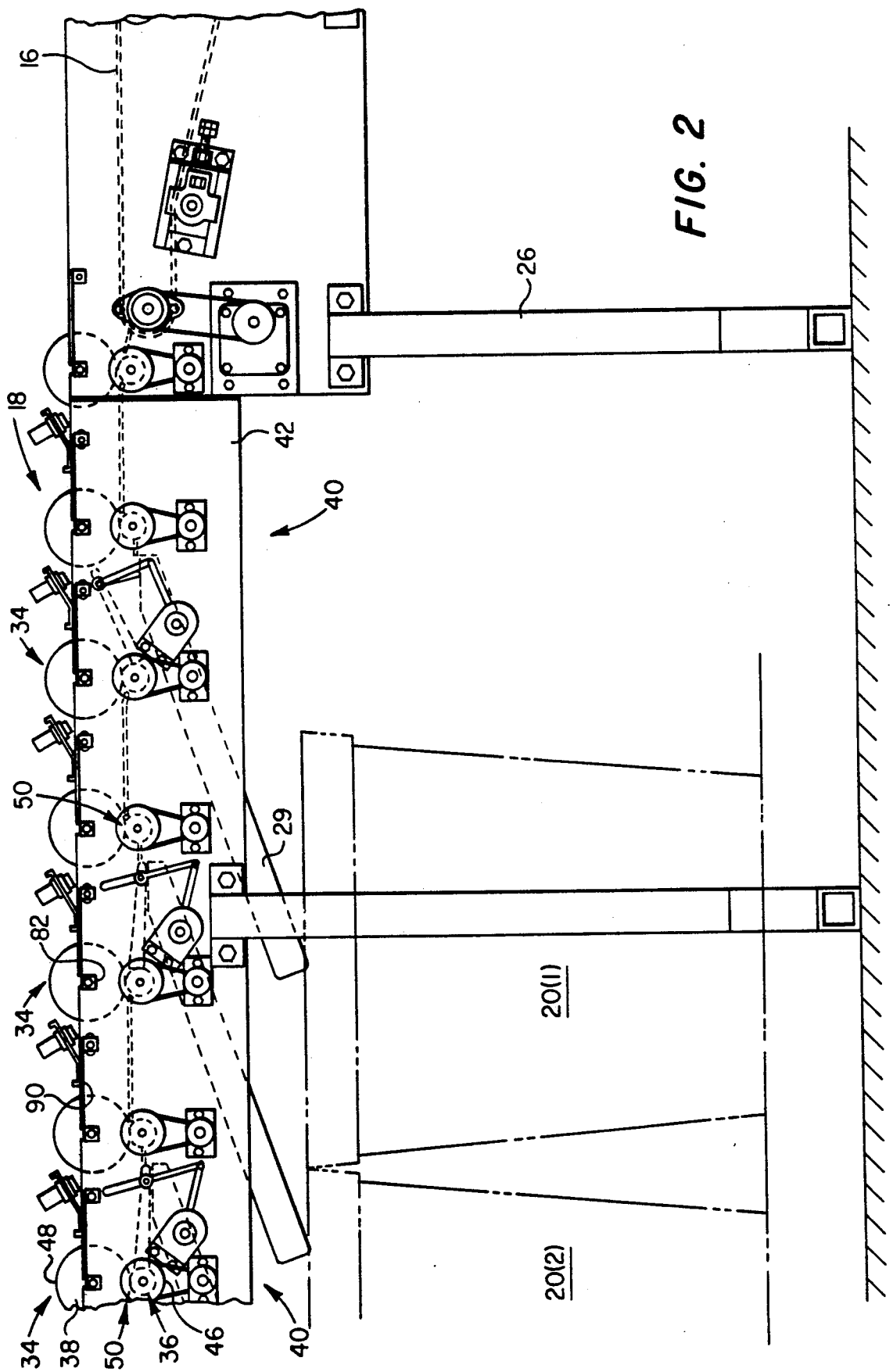
FIG. 2 is a side view of the product sorting apparatus as shown in FIG. 1.
Figure 3:
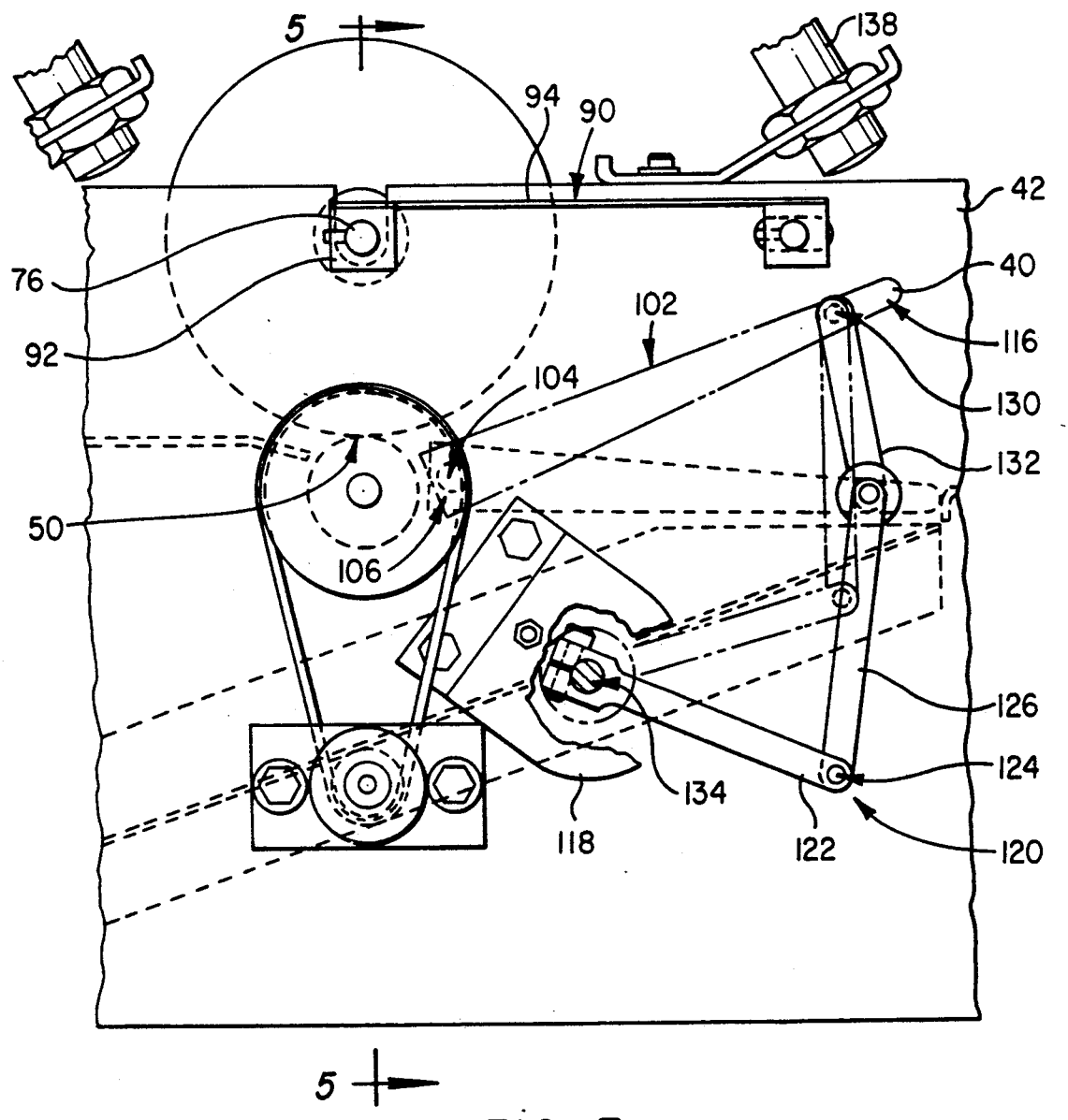
FIG. 3 is a blowup side view of the diverting gate area in FIG. 2.
Figure 4A:
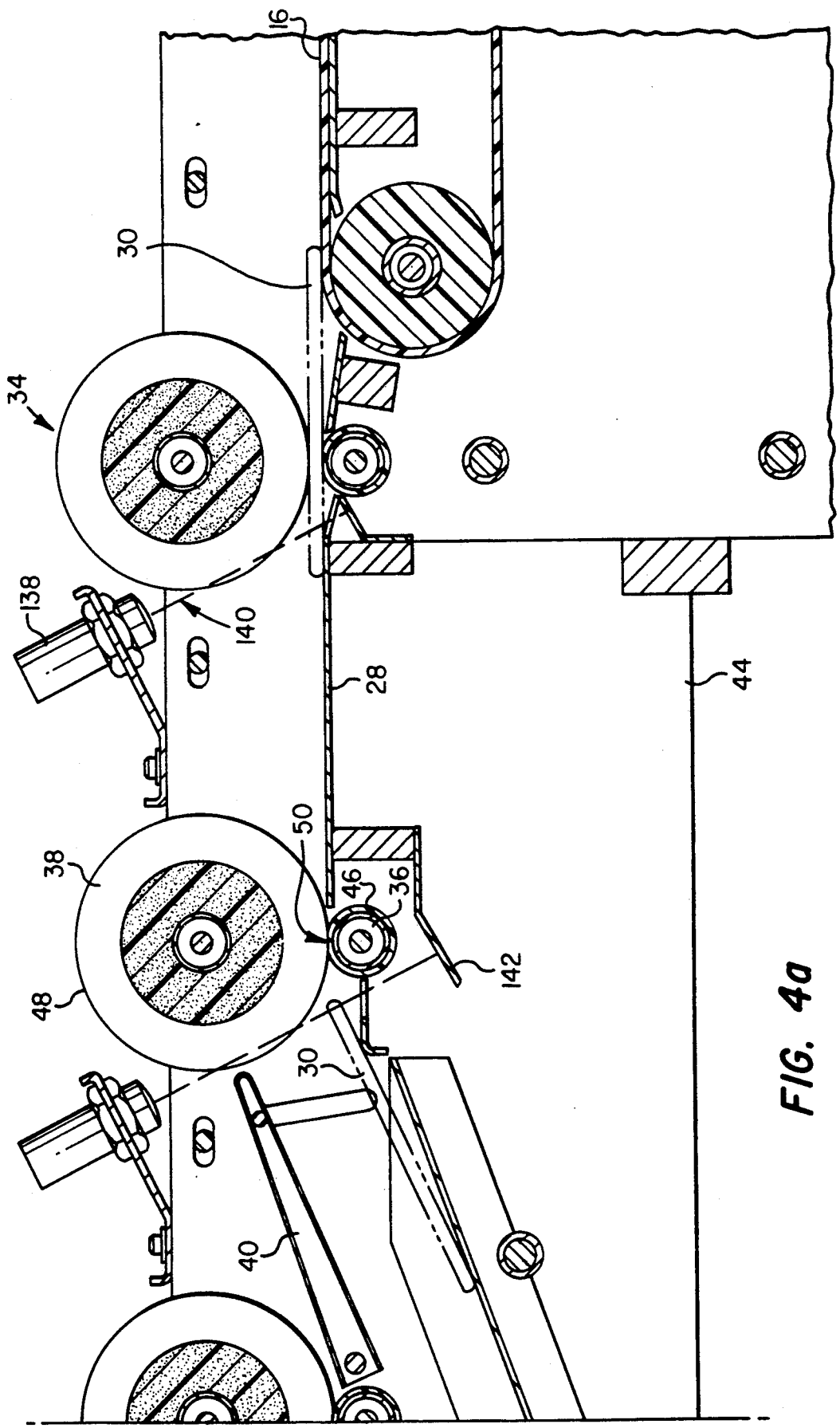

Referring now to the drawings, and particularly to FIG. 1, there is shown an apparatus 10 for sorting a wide variety of products. The apparatus 10 defines a transport path, illustrated in part by arrows 12 and 14, comprising an infeed conveyor belt 16 and a pinch roller diverting sorter 18. A number of destination output bins 20, located under the diverting sorter 18, receive products selectively diverted from the transport path. Two representative destination output bins, labeled 20(1) and 20(2) are shown in FIG. 1. It will be understood, however, that the output bins 20 may be replaced by takeaway belts or other conveying mechanism to receive diverted products and transport for further processing. The apparatus 10 further includes a bar code scanner 22 and a central processing unit 24. The main operating components of the apparatus 10 are supported over the output bins 20 by a frame 26.

In the operation of the apparatus 10, a singulated stream of individual products of various types, sizes and shapes to be sorted is received onto the infeed conveyor belt 16 and directed to the diverting sorter 18. The stream of products may be hand placed on the apparatus 10 in a single-file manner, or may be automatically singulated from a stack of products by an apparatus similar to that described in commonly assigned, co-pending application for Letters Patent, Ser. No. 593,783 filed Oct. 5, 1990. Computer control regulates entrance to, and controls downstream product movement through the diverting sorter 18.

A tracking photoelectric cell 21, located at the upstream edge of the infeed conveyor belt 16, detects the entrance of each product in the product stream into the apparatus 10. As the leading edge of the product blocks the photoelectric cell 21, the tracking algorithm executed by the central processing unit 24 calculates the time required for the product to pass and unblock the cell. This time is stored by the computer as the product length.

As the singulated product stream travels further along the infeed conveyor 16, bar code scanner 22 scans for an identification bar code label affixed to each product. The scanned bar code is transmitted to the central processing unit 24 for comparison to a stored sort-and-tally bar code list that identifies the destination output bin 20 into which each scanned and identified product is to be sorted. It will be understood that bar code scanner 22 may be replaced by an optical character reader or other scanning apparatus that detect informational parameters from each product. The detected informational parameters are then used to determine the proper destination output bin 20 into which the scanned product is to be sorted. In the alternative, the destination informational parameters may be manually keyed in as the products enter the apparatus 10.

The sequence of products detected by photoelectric cell 21 and the associated product destination bar codes identified by scanner 22 are linked by the processor to generate a product sequence and destination bin table. This list of products and destination bins is stored by the computer to assist in product tracking and accurate sorting. When the products enter the diverting sorter 18, the central processing unit 24 accesses the stored product table, tracks the progress of each product and transmits control signals to divert each product in the product stream from the transport path into its computer designated output bin 20. As the products pass through the diverting sorter, their length may again be measured and compared to the product length data detected by cell 21 and stored in the product sequence table to identify the presence of any unexpected or stray products.

The diverting sorter 18 consists of a series of roller pairs 34 arranged on a horizontal plane. The central processing unit 24, through sensing means to be described, tracks the location and movement of products 30 through the diverting sorter 18 by referencing the stored product sequence and destination bin table. In response to signals generated by the central processing unit 24, individual roller pairs 34 are selectively energized to effectuate downstream product movement while maintaining a proper distance between consecutive products.

The diverting sorter further comprises a number of diverting gates 40 that are selectively positioned along the diverting sorter 18 between adjacent roller pairs 34. As the tracked products move downstream through the diverting sorter 18, the computer, referencing the product sequence and destination bin table, selectively opens and closes individual diverting gates to direct the tracked products into the output bin 20 designated by the attached scanned bar code label and stored in the destination bin table. If the scanner 22 fails to find a bar code label on the product or if the bar code detected by the scanner does not match an entry on the stored code list, the central processing unit 24 directs the diverting sorter 18 to transport the product into a residual (reject) bin where the product is collected and either hand sorted or returned to the infeed conveyor 16 to be reprocessed by the apparatus 10.

The central processing unit 24 preferably comprises a computer for directing all of the functions of the separating and sorting apparatus 10 in accordance with a tracking and flow control software program to be described. In the preferred embodiment of the invention, the aforementioned computer includes such features as an 80286 CPU, 640K ram, 1.2 MB floppy disk, 20 MB hard disk, two serial ports and one parallel port. The computer, through the included serial and parallel ports, performs data acquisition functions, either by means of the bar code scanner 22 or by means of a sensor array to be described, and exercises individual and selective control over the elements of the apparatus 10, either by energizing the motors powering the infeed conveyor belt 16 and roller pairs 34 or by energizing the solenoids used to actuate the diverting gates 40. As computers of this type are well known and the detailed construction of the computer itself does not form a part of the present invention, further description of the computer is deemed unnecessary.

Sort-and-tally software for each anticipated product to be sorted are stored in ASCII data files located either on floppy disks or downloaded into the computer hard disk. The sort-and-tally software stores recognized bar codes and the location of the designated destination output bin into which products labeled a stored bar code are to be sorted. Several thousand valid bar codes may be input into the computer for any given sort-and-tally software. At the end of each run, the computer generates a report that tallies occurrences of each detected bar code. The report also tallies occurrences of unrecognized or missing bar codes to indicate the total number of products that were diverted into the reject bin for reprocessing Referring now simultaneously to FIGS. 1, 2, 3, 4A, 4B, and 5, the diverting sorter 18 includes a plurality of roller pairs 34 and diverting gates 40 arranged on a horizontal plane. The roller pairs 34 and diverting gates 40 are rotatably mounted to an opposed pair of longitudinally extending side plates, 42 and 44, in a manner to be described. Each roller pair 34 is comprised of an individually and selectively controlled drive roller 36 and a vertically adjacent, non-driven pinch roller 38. The roller pairs 34 extend transversely between, and perpendicular to the opposed side plates, 42 and 44, and are positioned relative to each other such that the outer surface 46 of drive roller 36 and the outer surface 48 of the adjacent pinch roller 38 tangentially meet at pinch point 50. Thus, rotation of drive roller 36 causes pinch roller 38 to rotate in the opposite direction.

The product transport path, illustrated in part by arrows 12 and 14 in FIG. 1, passes between the series of roller pairs 34 and is interrupted only when a diverting gate 40 opens to divert a product 30 into a destination output bin 20. The surface plane of the product transport path is defined by the upwardly disposed surfaces of each diverting gate 40 and each low-friction slider plate 28. The output transport path for each diverting gate 40, illustrated in part by arrow 13, is defined by a low-friction output slide 29 leading from each diverting gate 40 to an associated output bin 20.

The drive roller 36 is comprised of a shaft 52 having opposed ends, 54 and 56, and a hard, high-friction cover 58 defining the outer surface 48; of the roller. The drive mechanism for each drive roller 36 is preferably a variable speed D.C. electric motor 60. A pulley 62 mounted to the motor 60 directs operating power from the motor to a second pulley 64 by means of a drive belt 66. The second pulley 64 is attached to end 54 of shaft 52 supporting drive roller 36. Thus, in the preferred embodiment, a single variable speed motor is utilized to actuate a pulley 62 which in turn operates, through belt 66 and pulley 64, one drive roller 36.

Each drive roller 36 is rotatably mounted to the diverting sorter 18 by means of a pair of openings, 68 and 70, drilled in the opposed side plates, 42 and 44 respectively. A suitable low-friction bearing 72 inserted in each opening 68 and 70 for rotatably supporting each shaft end, 54 and 56, of drive roller 36 to the side plates, 42 and 44 respectively.

Use of a variable speed motor 60 for each drive roller 36 enables the upstream drive roller, upon opening of diverting gate 40, to be accelerated thereby propelling product 30 positioned at the pinch point 50 down the output slide 29. Acceleration of the sorted product in this manner results in a more uniform diverted product stack in the output bin 20, thus facilitating any further product processing. In addition, upon opening of diverting gate 40, product acceleration diverts products from the transport path more quickly, thereby increasing product throughput processing and decreasing the likelihood of product jams caused by premature closing of the gate.

Each pinch roller 38 is comprised of a shaft 74 having opposed ends, 76 and 78, and a soft foam cover 80 defining the outer surface 48 of the roller. A soft foam cover 80 is utilized in the diverting sorter 18 to more gently handle fragile or delicate products passing between the roller pairs 34. Furthermore, the surface of the soft foam cover conforms to irregular product surface contours and inhibits wandering or rotation of the product that may be caused by interaction between the irregular product surface and the pinch roller 38. This reduces the likelihood of stacking or jamming of products during downstream movement through the diverting sorter 18.

Each pinch roller 38 is detachably mounted to the diverting sorter 18 by means of a pair of notches, 82 and 84, cut in the upper edge 86 of each side plate, 42 and 44. Use of notches for mounting rather than openings (68 and 70), as used with drive roller 36, enables vertical movement of the pinch roller 38, as generally indicated at 88, as products 30 pass between the roller pairs 34 during operation of the diverting sorter 18.

The ends, 76 and 78, of pinch roller 38, are restrained within notches 82 and 84 by means of a pair of spring loaded retainers 90 mounted on each side of the diverting sorter 18. Use of a retainer is not necessary for efficient operation of the apparatus 10 as the weight of each pinch roller 38 tends to naturally return the roller into the mounting notches 82 and 84. The retainer 90, if used, is comprised of a clamp 92 rotatably mounted to shaft end 76 and a leaf spring 94 mounted at one end to clamp 92 and attached at the distal end to the side plate 42 of the sorter. The tension applied by leaf spring 94 is adjusted to insure that pinch roller 38 applies continuous pressure on drive roller 36. A suitable low-friction bearing may be inserted between shaft end 76 and clamp 92 to rotatably mount the pinch roller 38 to the retainer 90. An identical spring loaded retainer 90 is mounted to the opposite shaft end 78 and side plate 44 to further assist in restraining pinch roller 38 within notches 82 and 84.

The pinch roller 38 associated with each drive roller 36 applies pressure to the top side 98 of any product passing between roller pairs 34 at the pinch point 50. The application of pressure to the product 30 maximizes the friction force available between the product bottom side 100 and the outer surface 46 of the drive roller 36. Maximization of product/drive roller friction force assists in initiating and continuing downstream product movement thereby increasing downstream product throughput and decreasing the likelihood of product stacking or jamming.

A number of diverting gates 40, each having an associated destination output bin 20, are mounted at selected locations in the diverting sorter 18 such that two roller pairs 34 precede each gate. Each diverting gate 40 consists of a rectangular surface 102 transversely extending between, and rotatably mounted to the opposed side plates 42 and 44 of the diverting sorter 18. A shaft 104, mounted to the downstream transverse edge 106 of the rectangular surface 102, rotatably supports the diverting gate 40 to the diverting sorter 18. The diverting gate 40 is opened and closed by rotating the rectangular surface 102 about its attached shaft 104.

Rotational movement (opening and closing) of the diverting gate 40 is effectuated by applying force to the upstream transverse edge 116 of the rectangular surface 102. The drive mechanism for each diverting gate 40 is preferably a rotary solenoid 118. A linkage 120, mounted between the rotary solenoid 118 and the rectangular surface 102, applies the force necessary to open and close the diverting gate 40.

Linkage 120 is comprised of a rod 122 rotatably attached to an arm 126. Rod 122 is mounted at one end to the drive shaft 134 for the rotary solenoid 118. The distal end of rod 122 is rotatably mounted at pivot point 124 to one end of arm 126. The other end of arm 126 is rotatably mounted, by means of a pin 130, to the longitudinal edge 128 of rectangular surface 102 adjacent to diverting sorter side plate 42. Pin 130 couples diverting gate 40 to linkage 120 through a channel 132 cut in side plate 42. Actuation of rotary solenoid 118 causes rod 122 to rotate with the solenoid drive shaft 134. The distal end of rod 122 applies the necessary force, through arm 126, to open and close the diverting gate 40.

The shaft 134 of the rotary solenoid 118 extends transversely across the width of the diverting sorter 18 to a corresponding second linkage 121 mounted adjacent to side plate 44. The second linkage 12 is mounted to shaft 134 and longitudinal edge 136 in the same manner as linkage 120 is mounted to the shaft and edge 128. Application of actuating force to each side of the rectangular surface 102 by linkage 120 and 121 as described enables the diverting gate 40 to be more quickly opened and closed, thereby increasing product throughput and decreasing the likelihood of product jams. Furthermore, dual force actuation allows the diverting gate to be fabricated of light weight materials.

In the operation of the separating sorter 18, the motors 60 for each drive roller 36 and rotary solenoids 118 for each diverting gate 40 are selectively and individually energized by control signals output from the central processing unit 24 according to a tracking and flow control program to be described. Product tracking (position and movement) information is detected by an array of photoelectric cells 138 longitudinally dispersed over the separating sorter 18 and photoelectric cell 21 positioned above the infeed conveyor 18. Each photoelectric cell is mounted to a bracket 139 attached to the apparatus 10.

Tracking information from the photoelectric cells 138 is input into the central processing unit 24 and cross-referenced to the product sequence and destination bin table compiled by the central processor from the scanned bar codes and tracking data collected by scanner 22 and photoelectric cell 21. The tracking and flow control program monitors the location of each product passing through the transport path, selectively articulates individual drive rollers 36 to cause further downstream product movement while preventing tailgating of preceding products, and selectively actuates diverting gates 40 to direct products into their proper destination output bin 20 according to their scanned bar code 32. The photoelectric cells enable the apparatus 10 to measure the length of each product passing between the roller pairs 36 in the same manner as performed with photoelectric cell 21. This data is compared to the product length calculation made by photoelectric cell 21 and stored in the product sequence table to identify unexpected or stray products. All such identified products are added to the product sequence table and passed through the diverting sorter 18 into a residual (reject) bin for reprocessing.

Figure 5:
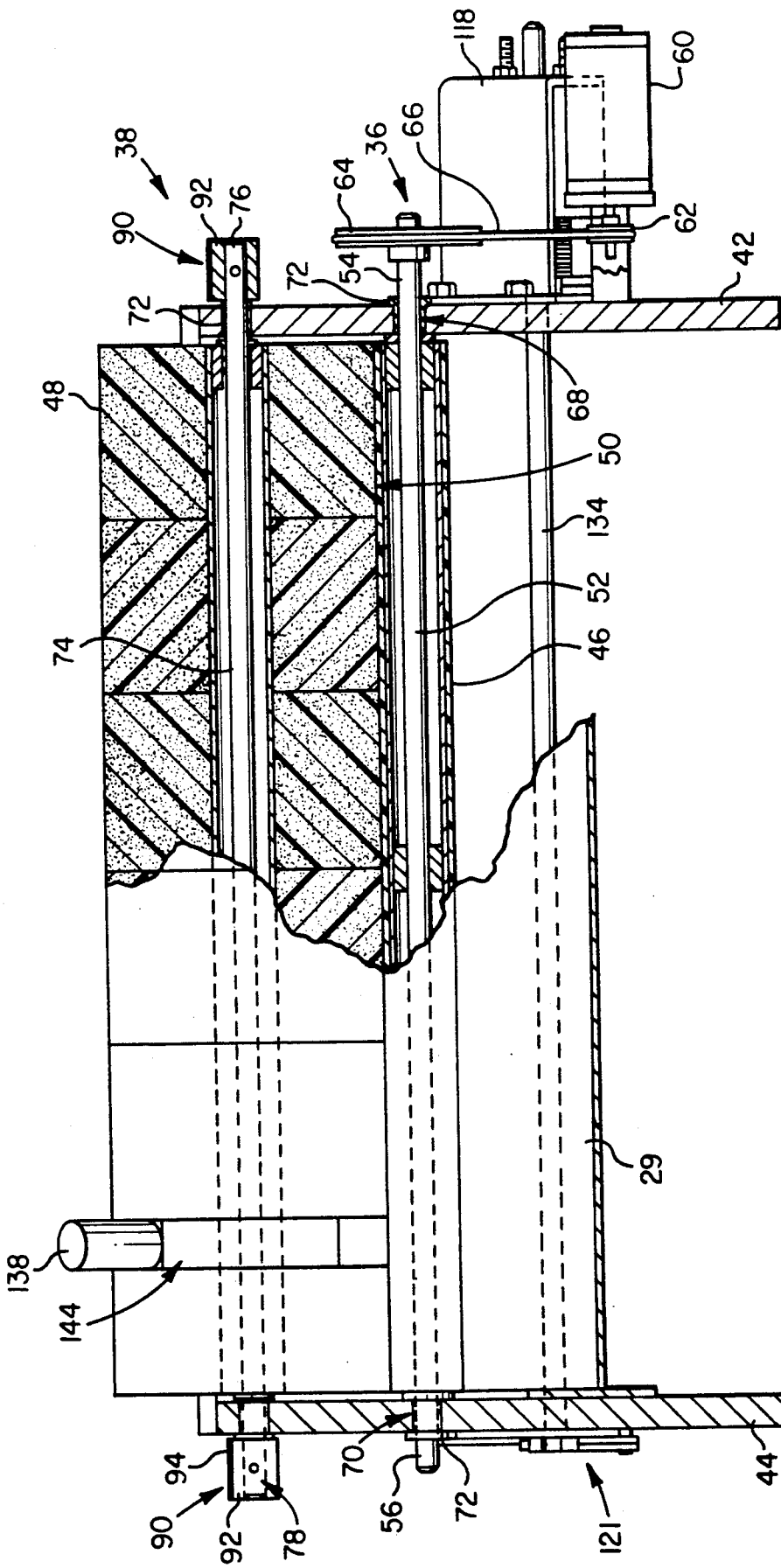
FIG. 5 is a cross-sectional view of one roller pair for the product sorting apparatus as taken along line 5—5 in FIG. 2.

Each photoelectric cell 138 in the cell array is positioned on the diverting sorter 18 to detect the presence or absence of product at each roller pair 34. The photoelectric cells 138 are positioned just downstream of pinch point 50 to detect an infrared beam 140 directed at, and reflected by a retroreflector 142 located under each drive roller 36. A channel 144, cut in the foam cover 80 of each pinch roller 38 as seen in FIG. 5, allows the photoelectric cell 138 to be advantageously positioned to detect product presence as soon as the products reach the pinch point 50.

Products passing between the elements of a roller pair 34 block the infrared beam 140 from the retroreflector 142 at pinch point 50 creating a "shadow" area on the separating sorter 18. The tracking and flow control program executed by the central processing unit 24 scans the entire array of photoelectric cells 138 to detect all shadows on the separating sorter 18, matches each shadow to a product on the product sequence and destination table and compares the tracked product information obtained to that stored from a previous scan. The tracking and flow control program thus continuously updates the stored information on the position, destination and relative movement of all products on the separating sorter 18.

Once the product destinations have been identified, the tracking and flow control program calls a subroutine to actuate stages of the transport path in a manner to be described. Execution of the called subroutine selectively energizes individual roller pairs 34 to cause downstream product movement and prevent consecutive products from tailgating. Furthermore, when each product reaches the diverting gate 40 associated with the product's designated destination bin, the processor 24 will divert the product from the transport path.

Figure 6:
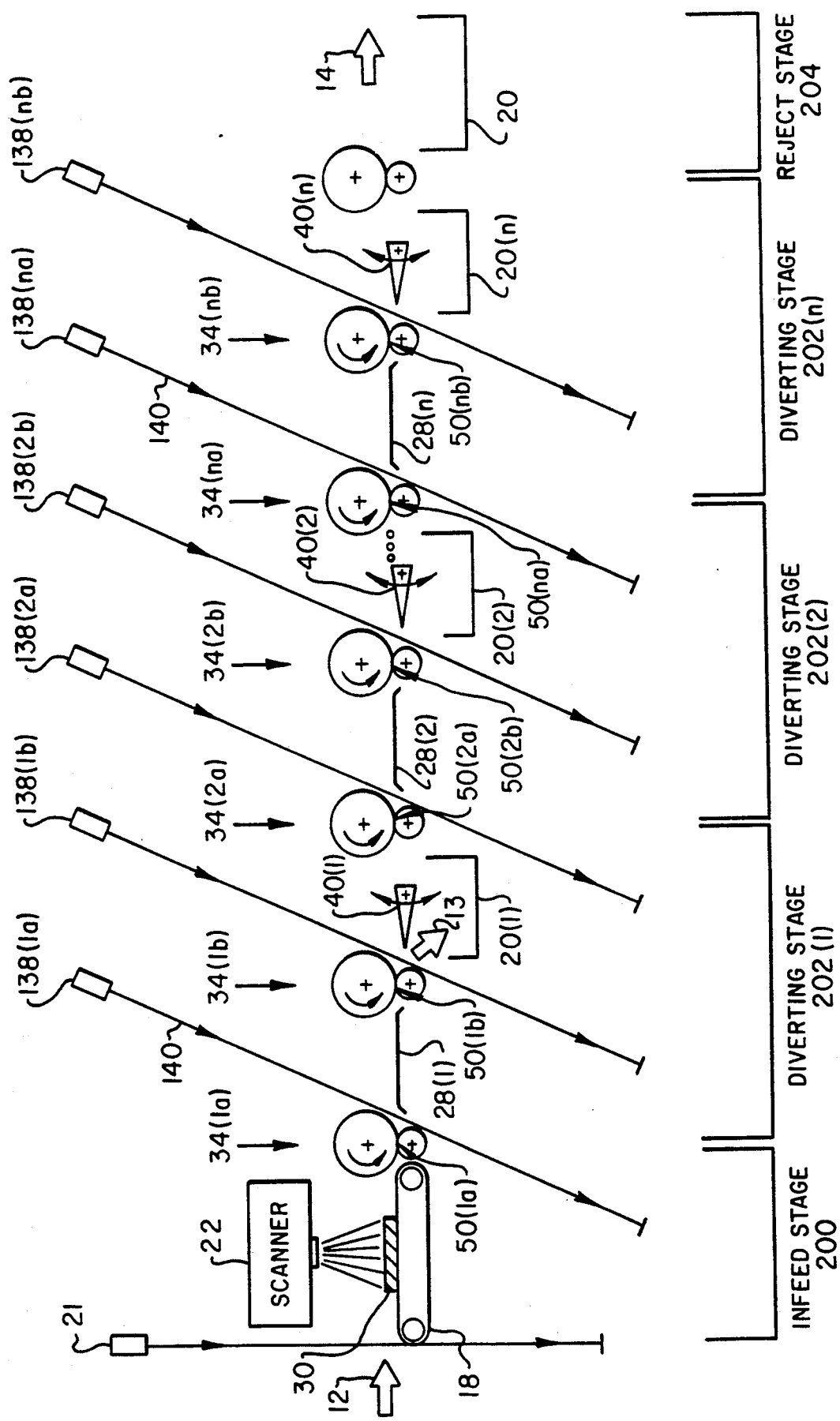
FIG. 6 shows a schematic diagram of the product sorting apparatus.

Referring now to FIG. 6, there is shown a schematic diagram of the product sorting apparatus 10. The apparatus 10 is comprised of three different stages, the infeed stage 200, the diverting stage 202, and the reject stage 204. The infeed stage is comprised of the infeed conveyor 18, photoelectric cell 21 and bar code scanner 22. Movement of the conveyor 18 causes the singulated stream of products 30 to break the infrared beam of photoelectric cell 21 and be transported under the bar code scanner 22. The central processing unit 24 then assembles from the detected information the product sequence and destination table used to accurately track and sort the products.

Assembly of the apparatus 10 normally requires the use of a plurality of diverting stages 202. Three representative diverting stages, labeled 202(1), 202(2) and 202(n), are shown in FIG. 6. Each diverting stage 202 is identical and includes a diverting gate 40 preceded by two adjacent roller pairs 34. A photoelectric cell 138 is positioned at the downstream edge of each roller pair 34 to detect the presence of a product 30 at the pinch point 50. A slider plate 28 and an output destination bin 20 complete the stage. The reject stage 204 includes an output bin 20 to collect all products 30 unsuccessfully sorted by the preceding diverting stages 202.

Figure 7A:
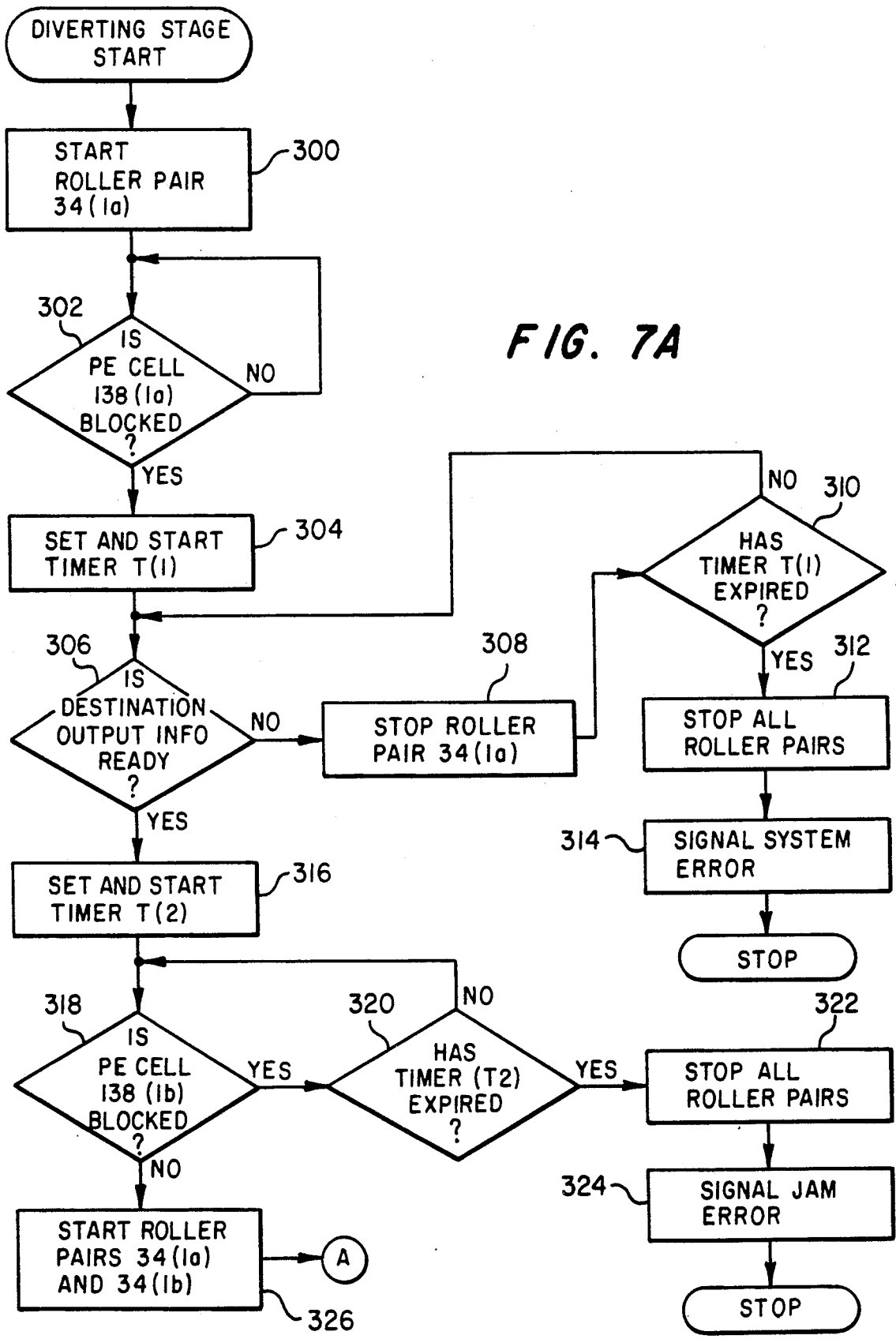
FIG. 7A, 7B and 7C shows a flowchart illustrating one embodiment for controlling the roller pairs and diverting gates to effectuate product sorting and downstream product movement.
Figure 7B:
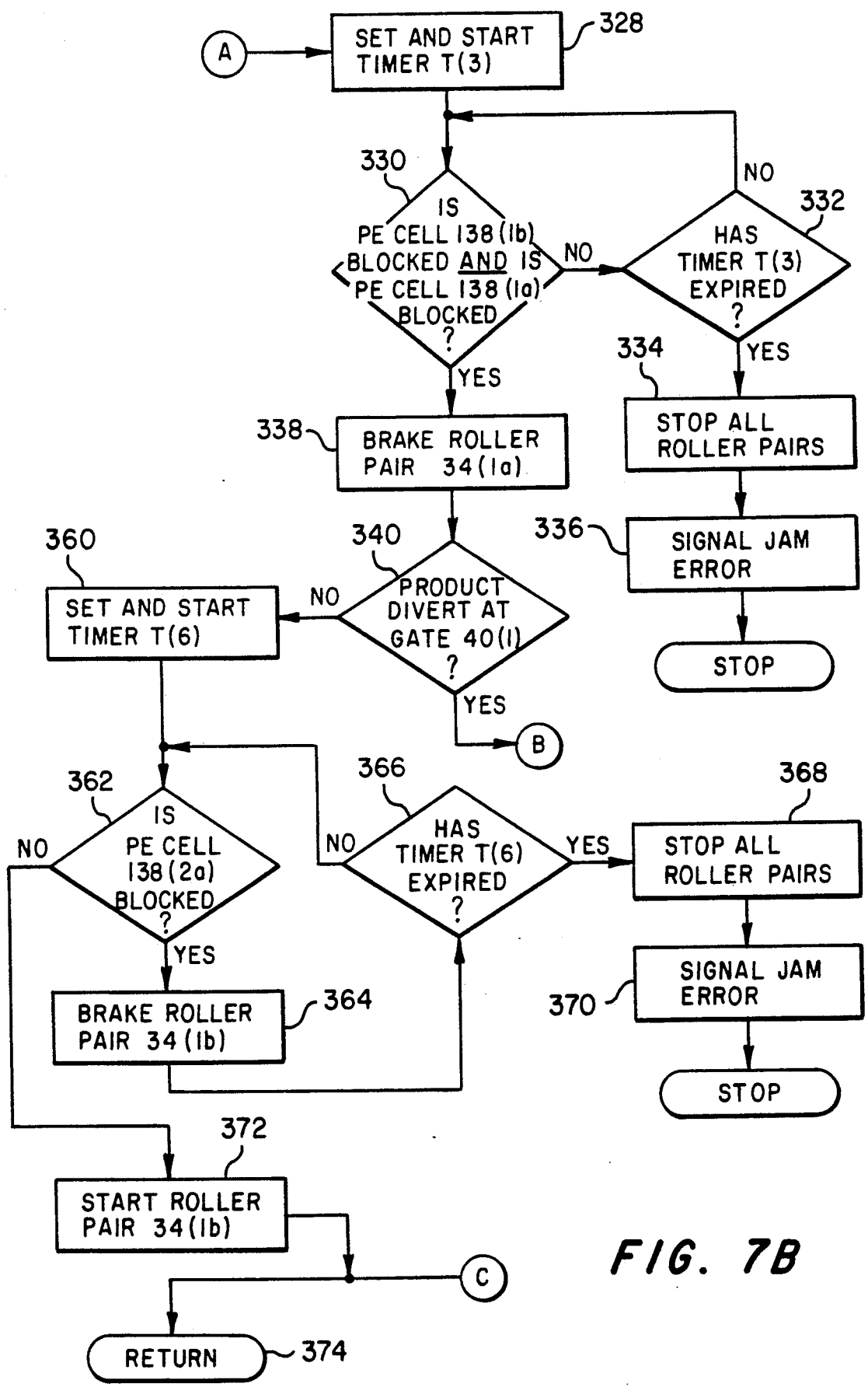
Figure 7C:
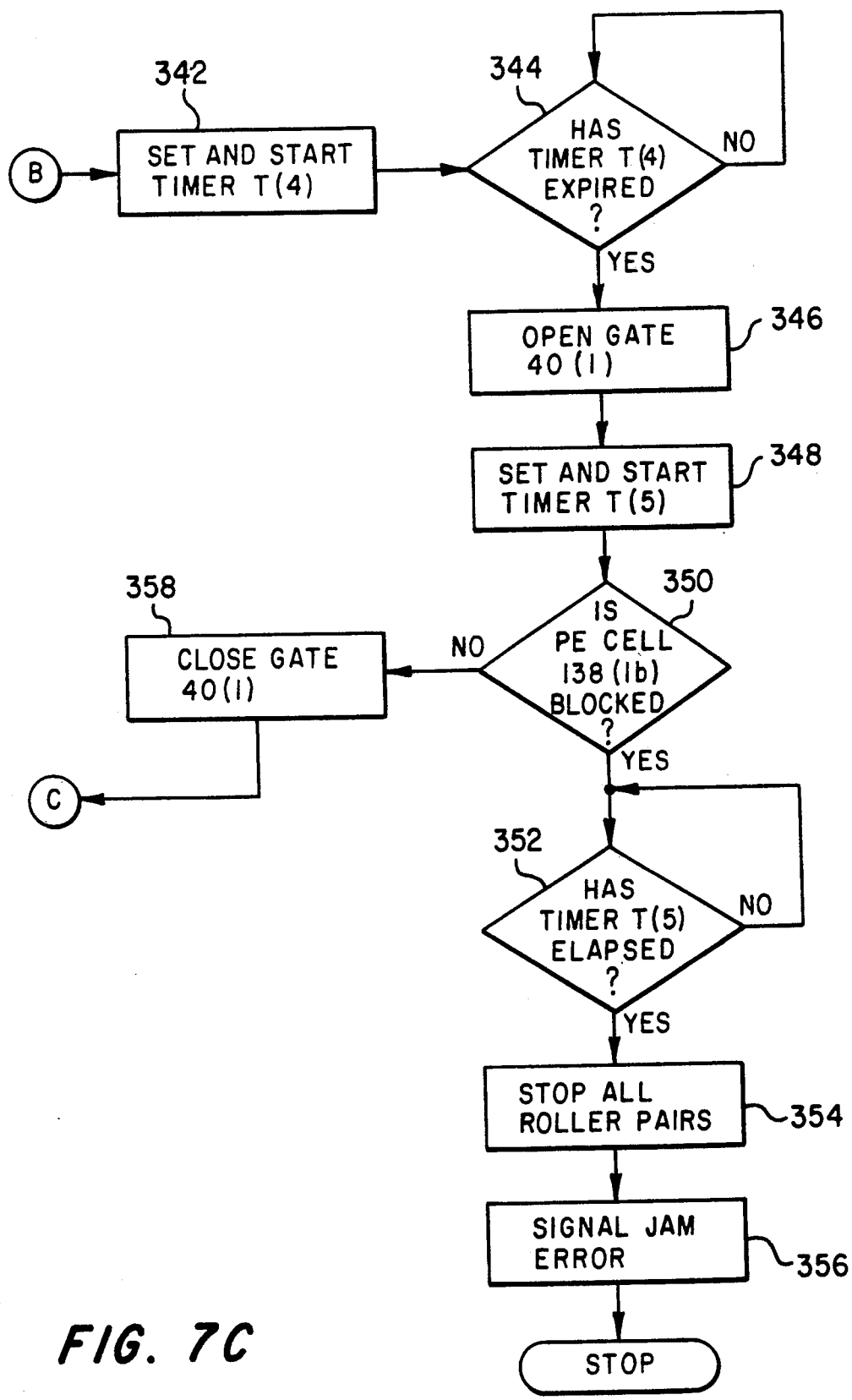

Reference is now made simultaneously to FIGS. 6 and 7 wherein FIG. 7 is a flowchart for a subroutine called by the tracking and flow control program executed by the central processing unit. The subroutine in FIG. 7 operates to control downstream product flow through each diverting stage 202. For ease of discussion of the operating characteristics of the diverting stage flow control subroutine, each apparatus component in FIG. 6 has been labeled with a first numerical postscript denoting the diverting stage within which it is located and a second alphabetical postscript denoting the existence of multiple components within the same diverting stage.

For example, each diverting stage 202 contains two roller pairs 34. The first roller pair in the first diverting stage 202(1) is thus labeled 34(1a), and the second roller pair in the second diverting stage 202(2) is labeled 34(2b). The photoelectric cells 138 and pinch points 50 are the only other multiple appearing elements within each diverting stage 202, and have been labeled similarly. All other singularly appearing elements, for example, diverting gates 40 and output bins 20, contain a single numerical postscript denoting the diverting stage within which the identified element is located. Thus, the diverting gate in the first diverting stage 202(1) is labeled 40(1) while the output bin in the second diverting stage 202(2) is labeled 20(2).

The subroutine for the tracking and flow control program is particularly directed to: Scanning the pair of photoelectric cells, 138(na) and 138(nb) within each diverting stage 202(n), articulating roller pairs 34(na) and 34(nb) to effectuate control downstream product movement, and actuating each diverting gate 40(n) to sort products into designated output bins 20(n) as determined by the bar code labels scanned prior to product entry onto the first diverting stage 202(1). In calling the subroutine, the tracking and flowchart program first services the most downstream diverting stage 202(n) containing a product to be sorted. The program then moves upstream addressing products in each consecutive diverting stage while continuing to monitor all previously serviced stages. The subroutine as shown in FIG. 7 is written to process only the first diverting stage 202(1) and reference hereinafter will be directed solely to that application. It will be understood, however, that this is for disclosure purposes only and that the actual subroutine called by the tracking and flow control program is written to service any of the n diverting stages 202(n) contained within the apparatus 10.

Upon entering the subroutine to service the first diverting stage 202(1), operating step 300 causes the first roller pair 33(1a) to rotate in anticipation of the entrance of a product from infeed conveyor 18. Photoelectric cell 138(1a) is then scanned during inquiry step 302 to determine if a product 30 has reached pinch point 50(1a). If photo cell 138(1a) has not been blocked (i.e., no product is present at pinch point 50(1a)), the subroutine continues to rotate roller pair 34(1a). If, on the other hand, photo cell 138(1a) has been blocked, thus indicating the arrival of a product 30 at pinch point 50(1a), the subroutine, during operation step 304, sets and starts timer T(1).

The subroutine next searches during inquiry step 306 for product tracking and disposition information for the product present at pinch point 50(1a) from the product sequence and destination table stored within the central processor. The information is used to identify the product and its designated output destination bin 20(n) as determined by the bar code label scanned during downstream movement through the infeed stage 200. If no such information is located, operational step 308 stops rotation of roller pair 34(1a) and the subroutine pauses to await the tracking and disposition information. If timer T(1) should expire, as determined by inquiry sequence 310, prior to locating the necessary tracking and disposition information, the subroutine will stop all system rollers (step 312) and signal a system error (step 314).

If the product tracking and disposition information has been located during inquiry step 306, a second timer T(2) is set and started by operating step 316. Timer T(2) is a jam detection timer that will determine, through inquiry sequences 318 and 320, whether the second roller pair 34(1b) in the first diverting stage 202(1) is clear to accept the product presently located at the first pinch point 50(1a). Inquiry step 318 tests photoelectric cell 138(1b) for blockage at the second pinch point 50(1b), and if blocked, tests for expiration of jam detection timer T(2) during inquiry sequence 320. If timer T(2) expires prior to detection of an unblocked photoelectric cell 138(1b), a jam detection error is declared by operational steps 322 and 324.

Failure to find photoelectric cell 138(1b) blocked activates both roller pairs 34(1a) and 34(1b) to advance the product downstream during operational sequence 326. During advance cycle sequence 326, a second jam timer T(3) is set and started (operational step 328) to test for product movement downstream to pinch point 50(1b). The subroutine then determines during "and" inquiry sequence 330 whether the upstream photoelectric cell 138(1a) is unblocked "and" the downstream photoelectric cell 138(1b) is blocked. Satisfaction of "and" inquiry sequence 330 indicates that the product has fully advanced from pinch point 50(1a) to pinch point 50(1b). On the other hand, expiration of jam timer T(3), as tested for in inquiry sequence 332, prior to satisfaction of "and" inquiry 330, signals the existence of a jam error (steps 334 and 336).

If "and" inquiry 330 is satisfied, the subroutine brakes upstream roller pair 34(1a) during operational sequence 338 and advances to decision step 340. At that point, the subroutine accesses the tracking and product destination information for the product now located at pinch point 50(1b) and determines if the product is destined for output bin 20(1). Satisfaction of decision step 340 advances the subroutine through step 342 where the diverting gate actuation timer T(4) is set and started to synchronize the opening of diverting gate 40(1) with the arrival of the product to be sorted into output bin 20(1). Detection of the expiration of gate actuation timer T(4) during inquiry 344 advances the subroutine through operation step 346 to open the diverting gate 40(1).

Roller pair 34(1b), never having been stopped since actuation in step 326, then propels the product through open gate 40(1) into output bin 20(1). Because the drive mechanism for each roller pair 36 comprises a variable speed motor, the subroutine may also be configured to direct accelerated rotation of roller pair 34(1b) thereby diverting products into each output bin 20(n) more quickly and uniformly. After opening the diverting gate 40(1), the subroutine sets and starts the diverting gate timer T(5) during sequence 346-356 to hold gate 40(1) open for a time period sufficient to allow the diverted product to clear the gate area prior to gate closure by operating step 358. After the product has been successfully diverted from the diverting stage 202(1), the subroutine returns through step 374 to the tracking and flow control program.

If the product located at pinch point 50(1b) is not destined to be diverted into output bin 20(1), the subroutine attempts to advance the product to the next diverting stage 202(2) for further processing. Another jam timer T(6) is set and started by operation step 360. The subroutine then examines the upstream photoelectric cell 138(2a) in the second diverter stage 202(2). Detection, during inquiry step 362, of a product blocking photoelectric cell 138(2a) causes the subroutine to brake roller pair 34(1b) and hold the product at pinch point 50(1b) until photoelectric cell 138(2a) is cleared. If the cell has not been cleared by the time jam timer T(6) expires, as tested for during inquiry sequence 366, a jam detection error will be signaled. An unblocked photoelectric cell 138(2a), on the other hand, allows the subroutine to advance through operation step 372 thereby starting roller pair 34(1b), if not already actuated, and advancing the product to the next diverting stage 202(2). The subroutine then returns through step 374 to the tracking and flow control program to service another diverting stage 202(n).

Although a preferred embodiment of the invention has been illustrated in the accompanying Drawings and described in the foregoing Detailed Description, it will be understood that the invention is not limited to the embodiment disclosed, but is capable of numerous rearrangements and modifications of parts and elements without departing from the scope of the invention.

We claim:

1. A method for diverting a selected product in a stream of products from a transport path having a plurality of diverting gates leading to output destinations comprising the steps of:

identifying one of the plurality of diverting gates on the transport path leading to a selected output destination for the selected product;

moving the selected product along the transport path to the identified diverting gate for the selected output destination;

opening the identified diverting gate for the selected output destination; and accelerating movement of a selected portion of the transport path to propel the selected product from the transport path to the selected output destination.

2. The method for diverting as in claim 1 wherein the step of identifying includes the steps of:

scanning a code affixed to the selected product, the code related to one of the output destinations; and locating the diverting gate corresponding to the output destination for the scanned code.

3. The method for diverting as in claim 1 wherein the step of moving includes the step of tracking movement of the selected product along the transport path.

4. The method for diverting as in claim 1 further including the step of controlling movement of the selected product along the transport path to maintain a predetermined distance between the selected product and a preceding product in the stream.

5. The method for diverting as in claim 4 wherein the step of controlling movement includes the steps of:

stopping movement of the selected product along the transport path when further movement of the selected product brings the selected product within a predetermined distance of the preceding product in the stream; and starting movement of the selected product along the transport path when the distance between the selected product and the preceding product exceeds the predetermined distance.

6. Apparatus for diverting a selected product in a stream of products from a transport path, comprising:

transport means defining the transport path for conveying the stream of products;

said transport means comprising:

a plurality of drive rollers for conveying products;

drive means for each roller to selectively actuate each roller to control product movement along the transport path; and means for accelerating each drive roller by the drive means to propel a product form the transport path;

a diverter gate having a contact surface for diverting products form the transport path, the contact surface pivotally mounted to the transport means at a pivotal end thereof and having a distal end; and actuation means for moving the diverter gate between a normally closed position and an open position.

7. The apparatus for diverting as in claim 6 wherein the actuation means includes an actuation arm mounted to the contact surface at the distal end to move the diverter gate between the normally closed and open positions.

8. The apparatus for diverting as in claim 6 further including means for tracking conveyance of the stream of products along the transport path.

9. The apparatus for diverting as in claim 8 wherein the means for tracking further includes means for selectively actuating the drive means to stop and start conveyance of a selected product to maintain a predetermined distance between the selected product and a preceding product in the stream of products.

10. Apparatus for diverting, comprising:

transport means for conveying a product along a transport path including a plurality of individually and selectively actuated drive rollers;

drive means for individually and selectively actuating each of the plurality of drive rollers;

normally closed diverter means having an opened position for inserting into the transport path to divert products from said transport means;

means for tracking conveyance of the product along the transport path; and control means, responsive to the means for tracking, for selectively moving the diverter means to the opened position and for accelerating actuation of the drive rollers by the drive means at the diverter means in the opened position to propel the product from the transport means.

11. Apparatus as in claim 10 wherein said means for tracking comprises an array of photoelectric detectors.

12. Apparatus as in claim 10 wherein the control means further includes means for controlling the drive means in response to the means for tracking to stop and start actuation of the drive rollers to prevent one product from tailgating within a predetermined distance of a preceding product on the transport means.

13. Apparatus as in claim 10 wherein the diverter means comprises:

a diverting gate comprising:
a substantially rectangular plate having a first and second transverse edge extending across the transport means and a pair of side edges; and
means for rotatably mounting the first transverse edge of said rectangular plate to the transport means; and means, responsive to the control means, for selectively causing said rectangular plate to rotate about said means for rotatably mounting between the normally closed and opened positions.

14. Apparatus as in claim 13 wherein the means for selectively causing further includes an actuation arm mounted to the side edge of the rectangular plate proximate to the second transverse edge to move the diverting gate between the normally closed and open positions.

15. A method for conveying and diverting a stream of products, comprising the steps of:

conveying the stream of products along a transport path having a plurality of diverting gates;

actuating one or more roller pairs to cause downstream movement of products through the transport path;

tracking the position and movement of each product along the transport path;

selectively controlling the movement of each product in the stream of products to maintain a separation distance between one tracked product and a preceding tracked product;

opening a selected one of the plurality of diverting gates for each product to cause each tracked product in a product stream to be diverted form the transport path to a selected output destination; and accelerating the rotation of a roller pair at the open diverting gate to accelerate the tracked product from the transport path.

16. The method for diverting as in claim 15 wherein the step of selectively controlling movement further includes the steps of:

stopping movement of the tracked product along the transport path when further movement of the tracked product brings the tracked product within the separation distance of the preceding tracked product; and starting movement of the stopped tracked product along the transport path when the distance between the stopped tracked product and the preceding tracked product exceeds the separation distance.

* * * * *

UNITED STATES PATENT AND TRADEMARK OFFICE
CERTIFICATE OF CORRECTION

PATENT NO. : 5,186,336

DATED : February 16, 1993

INVENTOR(S) : James M. Pippin, et al.

It is certified that error appears in the above-identified patent and that said Letters Patent is hereby corrected as shown below:

Col. 7, line 59, change "linkage 12" to --linkage 121--;
Col. 12, line 46, change "form" to --from--;
Col. 12, line 48, change "form" to --from--;
Col. 14, line 21, change "form" to --from--.

Signed and Sealed this

Twelfth Day of April, 1994

Attest:

BRUCE LEHMAN

Attesting Officer

Commissioner of Patents and Trademarks